United States Patent [19]

Terada et al.

[11] Patent Number: 5,024,908
[45] Date of Patent: Jun. 18, 1991

[54] LEAD STORAGE BATTERY

[75] Inventors: Masayuki Terada, Hyogo; Shinji Saito, Mie; Asahiko Miura, Nara, all of Japan

[73] Assignee: Shin-Kobe Electric Machinery Co., Ltd., Tokyo, Japan

[21] Appl. No.: 488,900

[22] Filed: Mar. 6, 1990

[51] Int. Cl.⁵ .......................... H01M 4/68; H01M 4/82
[52] U.S. Cl. .......................................... 429/245; 29/2
[58] Field of Search ................. 429/245; 29/623.5, 2

[56] References Cited

U.S. PATENT DOCUMENTS

| | | | |
|---|---|---|---|
| 4,148,978 | 4/1979 | Winsel et al. | 429/245 X |
| 4,761,356 | 8/1988 | Kobayashi et al. | 429/245 X |
| 4,906,540 | 3/1990 | Hoshihara et al. | 429/245 X |

*Primary Examiner*—Stephen J. Kalafut
*Attorney, Agent, or Firm*—Wegner, Cantor, Mueller & Player

[57] ABSTRACT

An Sn or Pb/Sn alloy heat-treated at 170° C. or higher for a given period of time is applied to the surface of a collector to make a lead storage battery which is improved in terms of its chargeability upon left overdischarged.

4 Claims, 2 Drawing Sheets

LEAD STORAGE BATTERY

BACKGROUND OF THE INVENTION

1. Field of the Invention

The present invention is concerned with improvements in or relating to a lead storage battery.

2. Prior Art

Lead storage batteries are placed in an unchargeable state upon permitted to stand for an extended prior of time or after overdischarging. In order to avoid this, various designs have heretofore been conceived for grid alloys for lead batteries or grid/active substance interfaces. For instance, it has been proposed to reduce or limit self discharge by reducing the content of Sb in their grid plates or use Pb/Ca base alloys as Sb-free alloys.

In order to improve the performance of lead storage batteries upon left overdischarged, it has also been known in the art to add alkali ions to electrolytes, increase the Sn content of grid alloys or apply Sn or Pb/Sn plating to the surfaces of grids.

However, some difficulties are involved in increasing the Sn content of grid alloys or applying Sn or Pb/Sn plating to the surfaces of grids, thereby improving the performance of lead storage batteries upon left overdischarged. That is, an increase in the Sn content of grid alloys leads to a remarkable rise in the cost. Problems with plating are that during formation or charging, deposits liberate Sn and disintegrate, thus producing an adverse influecne upon the performance of lead storage batteries upon left overdischarged, or the liberated Sn is dendritically deposited on cathodic plates, thus causing a through short circuit with respect to anodic plates. This is also true of the formation of alloy layers on the surfaces of collectors by dipping.

Lead storage batteries are made unchargeable especially when the specific gravity of sulfuric acid in electrolytes is 1.050 or less while they are permitted to stand. This may be avoided by increasing the concentration or weight of sulfuric acid. However, an increase in the concentration of sulfuric acid has an adverse influence upon the performance of cathodes and, particularly, reduces the service life of the batteries. An increase in the weight of sulfuric acid, on the other hand, entails an increase in the weight of the batteries. In any case, there is a limitation as to industrial practicality.

SUMMARY OF THE INVENTION

A primary object of the present invention is to provide a solution to such problems as encountered in the prior art.

According to one aspect of the present invention, there is provided a lead storage battery characterized by applying to the surface of a collector an Sn or Pb/Sn alloy heat-treated at 170° C. or higher for a given period of time.

According to another aspect of the present invention, there is provided a lead storage battery characterized by including an anodic plate obtained by preparing an intergral plate piece of a Pb/Ca base alloy sheeting and a Pb/Sn base alloy sheeting, forming the place piece with an unformed active substance filled in it and dipping the thus formed piece in sulfuric acid. That plate piece may be rolled into a sheeting, which is then to be expanded or stamped.

According to a further aspect of the present invention, there is provided a method for making an electrodic plate for lead storage batteries, characterized by dipping a collector of a Pb/Ca alloy containing no Sb in a molten Sn or Pb/Sn alloy bath to form an Sn or Pb/Sn alloy layer on the surface thereof, followed by heat-treatment at 170° C. or higher for a given period of time.

BRIEF DESCRIPTION OF THE DRAWING

The present invention will now be explained in more detail, by way of example, with reference to the accompanying drawings, in which.

DETAILED DESCRIPTION OF THE PREFERRED EMBODIMENTS

Upon allowed to stand for an extended period of time without charging, a lead storage battery is placed in an unchargeable state due to increased self-discharge. It is again put in an unchargeable state upon left after deep discharging. This is because a non-reactive $PbSO_4$ film is formed on the grid/active substance interface, resulting in an increase in the battery's internal resistance. When it is left overdischarged, the anodic plate shows a much increased internal resistance. This is because $PbSO_4$ is formed on the grid/active substance interface as a result of local battery reactions occurring between Pb, $PbO_2$ and $H_2SO_4$ on that interface. In order to improve the performance of the lead storage battery upon left overdischarged, therefore, it is considered to limit the formation of $PbSO_4$ or, if formed, keep the grid/active substance interface electrically conductive.

Heretore, Sn has been said to be effective for the performance of a lead storage battery upon left overdischarged. Although that effect is still in need of elucidation, it is probably due to Sn existing on the grid interface in the form of an oxide $SnO_2$. Even if a resistance film is formed, this $SnO_2$ can then serve as a conductor in it, so that the battery can be charged without being completely insulated by such a resistance film.

From the foregoing, it is predicted that Sn produces a practical effect, if it is present on the surface of the grid, and that in view of this, plating is effective. However, practicality teaches that during formation or charging, plating poses some problems such as disintegration.

According to the present invention, however, it is possible to obtain an Sn-enriched grid surface capable of preventing the disintegration of a plated or deposited layer and effective for the performance of a lead storage battery upon left overdischarged by heat-treating a grid plated with Sn or Pb/Sn, thereby diffusing Sn from the thus plated layer through the alloy matrix of the collector (grid body).

Figure 1:
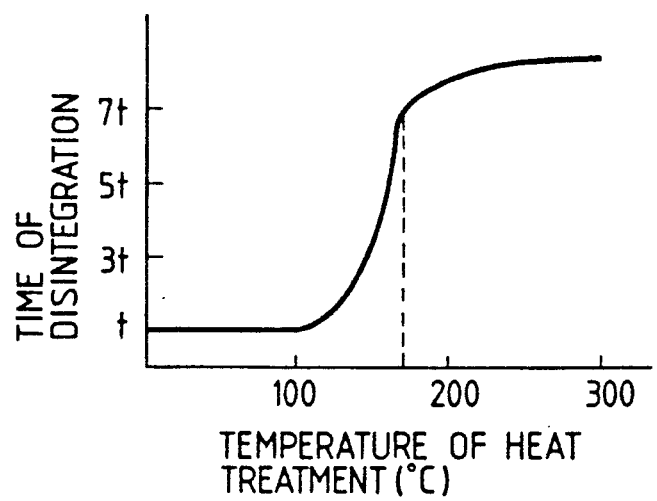
FIG. 1 is a graphical view showing the relationship between the treating temperature and the time of disintegration, when an alloy-deposited plate is oxidized at a constant current.

The diffusion of Sn through the grid alloy depends upon the temperature of the heat treatment. It is presumed that the more deeply Sn diffuses into the alloy layer, the more effectively can the disintegration of the plate layer be reduced. To confirm this, plated alloy sheets obtained by dipping and heat-treated at varied temperatures for 16 hours were oxidized at a constant current in a solution of sulfuric acid to measure the length of time to the disintegration of the alloy layers due to dipping. The results are plotted in FIG. 1, from which it is found that as the temperature of the heat treatment rises, the length of time to disintegration increases exponentially. Although the heat treatment shows its own effect even in a region 170° C. or lower, yet a treating time longer than 100 hours is required to obtain an effect similar to that achieved by the heat treatment at 170° C. or higher. However, the heat treatment at 120° C. or lower is unpractical, since no effect is obtained whatsoever. As mentioned above, the heat treatment is greatly effective for the disintegration of deposits.

It is understood, on the other hand, that the specific gravity of the electrolyte left overdischarged drops to a value sufficiently low to increase a liquid resistance. This is one cause of the increase in internal resistance. However, it is possible to increase the conductivity of the electrolyte and decrease the internal resistance in return by the addition of alkaline or alkaline earth metal ions, thereby improving the chargeability of the battery after left overdischarged.

Reference will now be made to the second aspect of the present invention.

When a lead storage battery is left overdischarged, the specific gravity of its electrolyte decreases. Such a decrease becomes larger in the vicinity of the grid than on the surface thereof. In such a case, the solubility of Pb of the grid plate is so increased that $Pb_{2+}$ is liberated. This bonds to $OH-$ or $O^{2-}$, yielding PbO. In contrast to such an oxidation reaction, the potenital of $PbO_2$ in the vicinity of the anodic grid plate becomes base at higher pH, so that a reduction reaction of $PbO_2$—$PbSO_4$ can occur, thus giving a local battery reaction system for the formation of PbO. At high pH, on the other hand, $PbSO_4$ is repeatedly dissolved and precipitated to form macrocrystals, which then provides a deposit in the vicinity of the oxide film on the interface due to their non-reducing properties. Thus, a high-resistance film is formed by the formation and growth of $PbSO_4$ and the formation of PbO, making charging impossible.

Sn is said to change the nature of such a high-resistance film and be thus effective for the performance of a lead storage battery upon left overdischarged. With this in mind, the present inventors have attempted to bring Sn as closely to the surface of the grid plate as possible. Although that effect is still in need of chemical clarification, it is probably due to Sn being oxidized into SnO or $SnO_2$. The semiconductive nature of such oxides makes it difficult to form a high-resistance substance of PbO.

On the other hand, $PbSO_4$ also occurs in the above high-resistance substance. However, this should be reduced or limited. According to the second aspect of the present invention, this is achieved by dipping the anodic sheet of the grid plate in diluted sulfuric acid. When the anodic sheet is immersed in diluted sulfuric acid, it is maintained at a certain potential, thus yielding $\alpha$-$PbO_2$ at the grid sheet interface. Alpha-$PbO_2$, on the one hand, serves to maintain conductivity on the grid sheet interface and, on the other hand, renders it difficult to cause a reaction by way of which $PbSO_4$ is formed, since it is more inert with respect to discharge reactions and more intimate in structure than $\beta$-$PbO_2$. Further, $\alpha$-$PbO_2$ produces an effect upon limiting the diffusion of $SO_4^{2-}$ in the vicinity of the grid sheet. Still further, $\alpha$-$PbO_4$ is so stable that conductivity can be maintained.

EXAMPLES

Example 1—First and Third Aspects of the Invention

Figure 2:
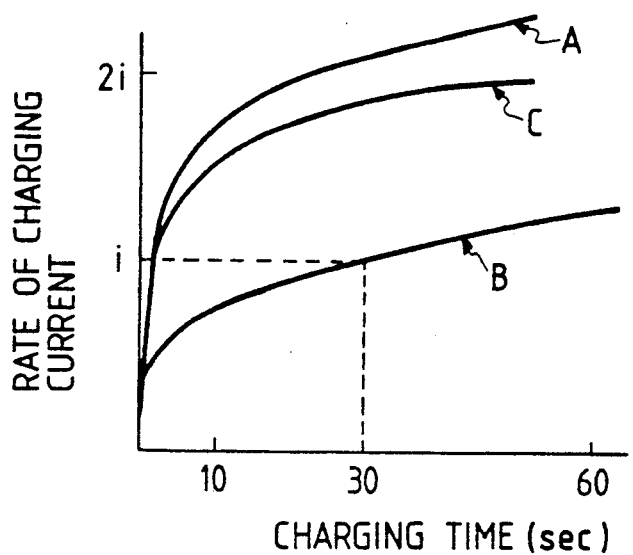
FIGS. 2 and 3 are graphical views showing charge characteristics-curves after initial charging, 10-cycle charging and seven days of overdischarging.
Figure 3:
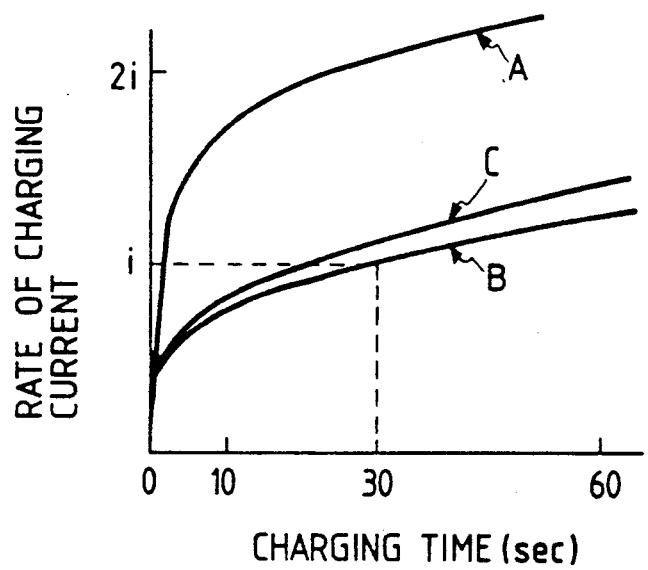

In order to make an investigation of how much the electrodic sheet obtained by dipping and heat treatment is improved in terms of its performance after left overdischarged, a battery of 4 Ah-2 V was prepared with the above electrodic sheet. After initial charging, the battery was discharged at a constant resistance for 24 hours and then allowed to stand under open-circuit conditions for 7 days. Thereafter, charging was carried out at a constant voltage of 2.45 V to measure charging currents after the lapse of 10 seconds, 30 seconds and 60 seconds. The results are shown in FIG. 2. A current through Battery A—heat-treated—is about 2 times larger than that through Battery B—conventional, and about 1.6 times larger than that through Battery C—untreated. However, when 10-cycle charging and discharging are repeated before overdischarging, Battery C deteriorates as much as Battery B, but Battery A does not substantially.

Example 2—Second Aspect of the Invention

An alloy sheeting of Pb/Ca/0.3 wt % Sn was rolled between alloy sheetings of Pb/3 wt % Sn, each of 0.5 mm in thickness, into an integrated sheet. Using this sheet as an anodic plate, a battery is assembled.

After formation, the anodic plate was immersed in diluted sulfuric acid to provide thereon a thick or thin coat of $\alpha$-$PbO_2$. As control, a battery was made with a grid anode obtained by casting an alloy of Pb/Ca/3 wt % Sn.

Experiment 1—Capacity Storability (Self-Discharge)

After charging, the batteries were discharged in an air atmosphere of 45° C. to measure their capacity after the lapse of 1 month and 3 months. The rate of capacity storability was found in terms of the ratio with respect to the initial capacity.

Experiment 2—Performance After Left Overdischarged

After charging, the batteries were connected to a given resistance for 24 hours for discharging in such a manner that the amount of discharging 1.15 times larger than nominal capacity was assured. Thereafter, the batteries were allowed to stand under open-circuit conditions at 45° C. for 1 month, followed by 24-hour charging at a constant voltage of 2.45 V/battery. The rate of recovery of charge was found in terms of the ratio of the recovered capacity to the initial capacity.

The results of experimentation are summarized in Table 1.

TABLE 1

| Grid plate form | $\alpha$-$PbO_2$ | Capacity storability | | Performance upon left overdischarged |
|---|---|---|---|---|
| | | 1 month | 2 months | |
| Pb—Ca—3—Sn (Casting) | Thin | 80.4 | 61.6 | 86.3 |
| P—Ca—0.3 Sn + Pb—3Sn Rolled sheet | Thin | 84.7 | 73.8 | 93.8 |
| Pb—Ca—0.3 Sn + Pb—3Sn Rolled sheet (Present invention) | Thick | 92.5 | 82.7 | 98.9 |

From Table 1, it is found that the rolled sheets are improved over the cast one in terms of self-discharge and performance after left overdischarged. With the sheets containing Sn in the same amount of 3%, there is a difference in effect between when it is diffused into the grid plate and when it is diffused into the surface layer. Even with the same rolled sheets, more improved effects upon both performances are obtained with the thick $\alpha$-$PbO_2$ layer than with the thin one. It is thus found that $\alpha$-$PbO_2$ produces a synergistic effect and is effective for self-discharge from the outset.

As will be understood from the foregoing, the present invention makes a breakthrough in the art.

What is claimed is:

1. A lead storage battery comprising a collector plated with an alloy matrix of Sn or Pb/Sn, wherein the collector is heat-treated at a temperature of at least 170° C. to effectively diffuse Sn into the alloy matrix.

2. A lead storage battery comprising an anodic plate obtained by forming an integral plate piece of a Pb/Ca base alloy sheeting with a Pb/Sn base alloy sheeting, and dipping the thus formed piece in sulfuric acid.

3. A lead storage battery as claimed in claim 2, wherein said plate piece is formed by rolling into a sheeting, which is then expanded or stamped.

4. A method for making an electrodic plate for lead storage batteries, comprising dipping a collector of a Pb/Ca alloy matrix containing no Sb in a molten Sn or Pb/Sn alloy bath to form an Sn or Pb/Sn alloy layer on the surface thereof, and heat treating the collector at a temperature of at least 170° C. to effectively diffuse Sn into the alloy matrix.

* * * * *